United States Patent [19]

Young et al.

[11] 4,286,190

[45] Aug. 25, 1981

[54] COMPACT FLUORESCENT LAMP HAVING A PARTITIONED ENVELOPE

[75] Inventors: Robert G. Young, Nutley; Henry Skwirut, Verona, both of N.J.

[73] Assignee: Westinghouse Electric Corp., Pittsburgh, Pa.

[21] Appl. No.: 79,016

[22] Filed: Sep. 26, 1979

[51] Int. Cl.³ .............................................. H01J 61/16
[52] U.S. Cl. .................................... 313/493; 313/204; 313/485
[58] Field of Search ......................... 313/493, 485, 204

[56] References Cited

U.S. PATENT DOCUMENTS

| | | |
|---|---|---|
| 1,963,962 | 6/1934 | Barclay . |
| 2,121,333 | 6/1938 | Barclay . |
| 2,133,205 | 10/1938 | McCauley . |
| 2,847,603 | 8/1958 | Engelbart . |
| 3,024,383 | 3/1962 | Doeting . |
| 3,084,271 | 4/1963 | Swanson . |
| 3,521,120 | 7/1970 | Anderson . |
| 3,899,712 | 8/1975 | Witting . |
| 3,903,447 | 9/1975 | Young et al. . |
| 3,953,261 | 4/1976 | LoGiudice . |
| 4,095,135 | 6/1978 | Yamazaki et al. . |
| 4,187,446 | 2/1980 | Gross et al. ...................... 315/58 |

*Primary Examiner*—James B. Mullins
*Assistant Examiner*—Darwin R. Hostetter
*Attorney, Agent, or Firm*—D. S. Buleza

[57] ABSTRACT

A compact fluorescent lamp of high brightness is provided by a partition structure within the lamp that divides the tubular envelope into a plurality of interconnected sectors and also defines a core chamber that is not traversed by the discharge and is of predetermined size relative to the envelope. The core chamber serves both as a conduit or passageway for the lead-in conductors of one of the electrodes and as a means for enhancing the efficacy of the lamp by displacing the discharge outwardly toward the envelope walls and thus minimizing the "light entrapment" effect deep within the envelope and the corner portions of the partition structure. The use of the core chamber as a lead wire conduit permits the electrodes to be located at the same end or opposite ends of the envelope—thereby providing "odd-pass" discharge lamps of single-ended construction or "even-pass" discharge lamps of double-ended construction that can be readily fabricated.

10 Claims, 10 Drawing Figures

COMPACT FLUORESCENT LAMP HAVING A PARTITIONED ENVELOPE

CROSS-REFERENCE TO RELATED APPLICATION

The subject matter of this application constitutes an improvement over the invention disclosed and claimed in copending application Ser. No. 47,834 of R. G. Young et al., filed June 12, 1979, which application is assigned to the same assignee as this application.

BACKGROUND OF THE INVENTION

1. Field of the Invention

This invention generally relates to electric discharge lamps and has particular reference to an improved fluorescent lamp of compact size and high brightness that has a partitioned envelope and is suitable for use in residential and commercial lighting fixtures.

2. Description of the Prior Art

Electric discharge lamps having envelopes which are internally partitioned to provide one or more elongated discharge paths are generally well known in the art. U.S. Pat. No. 2,121,333 to Barclay discloses a single-ended type lamp of such construction wherein glass panels joined to the glass envelope serve as the partition means. Another fluorescent lamp of this type is disclosed in U.S. Pat. No. 3,024,383 to Doering and employs a thin sheet of glass or suitable ceramic as the partitioning means which divides the interior of the envelope into either two or four interconnected sectors. A double-ended fluorescent lamp having a longitudinal partition that extends along the axis of a tubular envelope between two pairs of oppositely-disposed electrodes to provide a dual-arc device is disclosed in U.S. Pat. No. 3,084,271 to C. E. Swanson.

Discharge lamps having tubular envelopes with partition means or a filler, such as a core member, that prevent the arc from passing along the axis of the lamp between electrodes located at the ends of the envelope are also generally well known in the art. U.S. Pat. No. 1,963,962 to Barclay, for example, discloses a discharge lamp having a tubular envelope that is partitioned in such a manner that a plurality of arc channels are provided which are disposed around a central bore or chamber. U.S. Pat. No. 2,133,205 to McCauley discloses a tubular double-ended discharge lamp that has a channeled core or filler member which forces the arc to follow various paths around the core member and produce a changing luminous effect.

Various other types of fluorescent lamps having envelopes that are so constructed that the discharge is prevented from passing along the center of the envelope (or is forced to follow a path confined to a space around an inner envelope component) are disclosed in U.S. Pat. Nos. 3,521,120 (Anderson); 3,953,761 (LoGiudice, FIGS. 6-8 embodiments); and 4,095,135 (Yamazaki et al.). A fluorescent lamp having a bulb which forces the arc to follow a helical path around the lamp axis is disclosed in U.S. Pat. No. 3,899,712 to Witting. Another fluorescent lamp of helical-arc design having a tubular envelope which contains a coaxial closed tube that houses lead-in conductors and thus permits the electrodes to be disposed at opposite ends of the envelope with all of the lead-in conductors extending through the same end of the envelope so that the lamp is of single-ended construction is disclosed in U.S. Pat. No. 3,903,447 to Young et al. A glow discharge device which also has a helical-arc channel and a centrally-chambered envelope which permits lead wires to be sealed through the same end of the envelope and connect with electrodes located at opposite ends of the envelope is disclosed in U.S. Pat. No. 2,847,603 to Engelbart.

While the prior art discharge lamps were satisfactory in the sense that they reduced the physical size of the lamp by forcing the arc to follow a tortuous path that was much longer than the axial length of the envelope, they were rather complicated and expensive to manufacture and were not very efficient. In addition, they failed to teach those skilled in the art how to construct a single-ended discharge lamp having a retroverted arc channel that forced the discharge to traverse or "pass through" the envelope an odd number of times in longitudinal fashion. The concept of an electric discharge lamp of double-ended construction having a partitioned envelope that defines a retroverted arc channel which forces the discharge to "pass through" the envelope longitudinally an even number of times is also not found in the teachings of the aforementioned prior art patents.

SUMMARY OF THE INVENTION

The foregoing problems and deficiencies of the prior art are solved in accordance with the present invention by providing a compact fluorescent lamp which has an elongated envelope that is internally partitioned in such a fashion that it not only improves the efficacy of the lamp but provides means for accommodating a pair of electrodes and their lead-in conductors in such a manner that single-ended "odd pass" lamps and double-ended "even pass" lamps can be readily manufactured.

In preferred embodiments, the foregoing objectives are achieved by inserting a partition assembly into a tubular envelope which divides the envelope interior into a predetermined number of interconnected arc chambers that define a single continuous discharge channel that extends longitudinally along the envelope around a central chamber which constitutes the core of the partition assembly and is not traversed by the discharge, pursuant to the teachings of the aforementioned copending application Ser. No. 47,834 of Young et al. In addition to maintaining the maximum cross-sectional dimension of the core chamber in the range of from about 25% to about 85% of the envelope diameter (or its maximum cross-sectional dimension) in order to reduce the "light-trapping" effect of the partition structure, the closed core chamber is used as a housing or conduit for the lead-in wires of one of the electrodes—thus permitting a single-ended lamp to be made with electrodes at opposite ends of the envelope (odd-number pass discharge) or a double-ended lamp to be made with a pair of electrodes at the same end of the lamp so as to provide an even-number pass discharge channel.

BRIEF DESCRIPTION OF THE DRAWINGS

A better understanding of the invention will be obtained from the following exemplary embodiments shown in the accompanying drawing, wherein.

DESCRIPTION OF THE PREFERRED EMBODIMENTS

Figure 1:
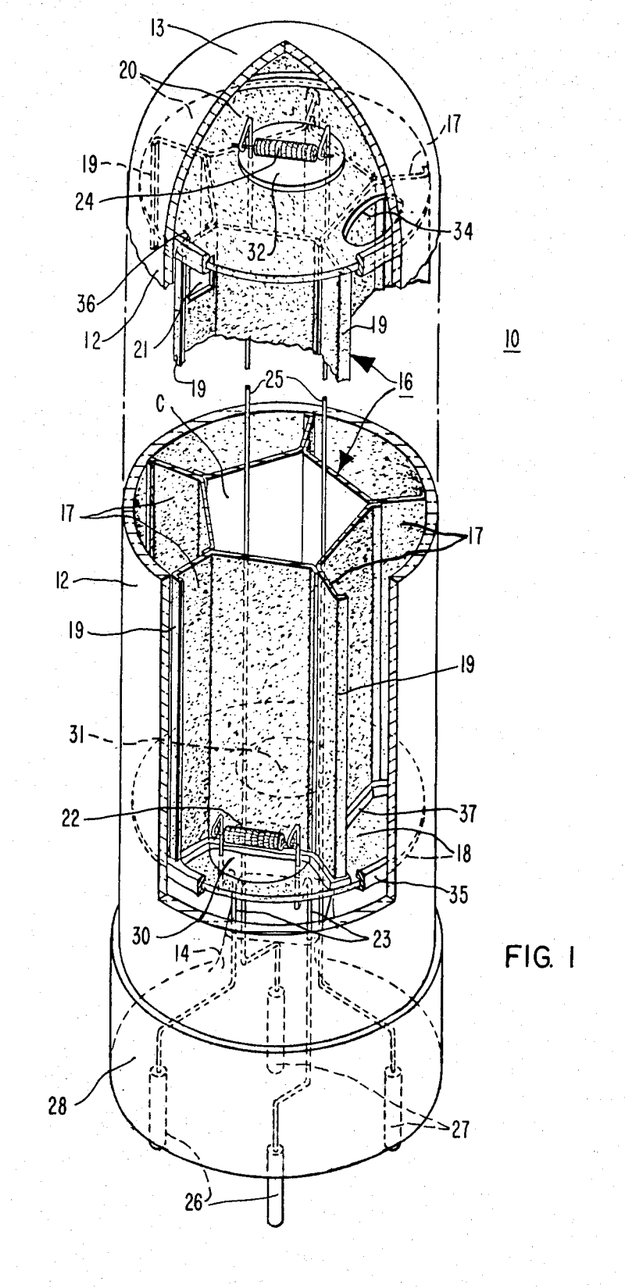
FIG. 1 is a perspective cut-away view of a compact single-ended "five-pass" fluorescent lamp made in accordance with the invention.
Figure 2:
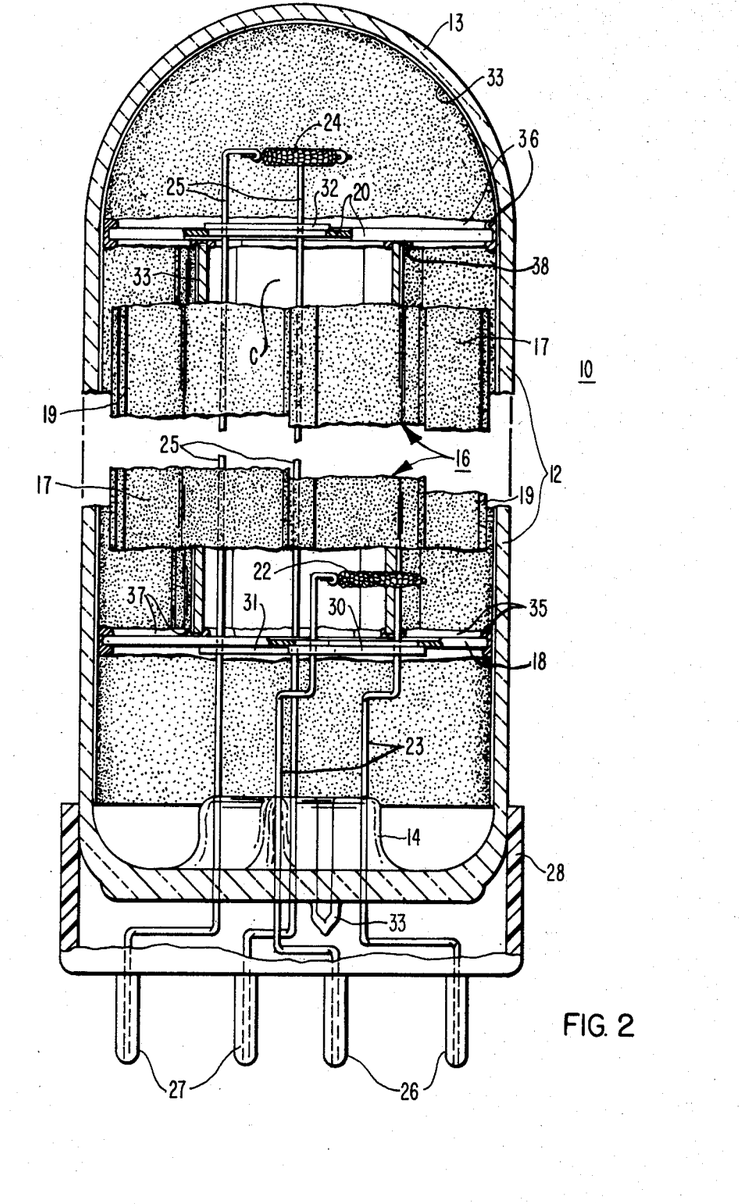
FIGS. 2 and 3 are enlarged longitudinal and cross-sectional views, respectively, of the fluorescent lamp shown in FIG. 1.
Figure 3:
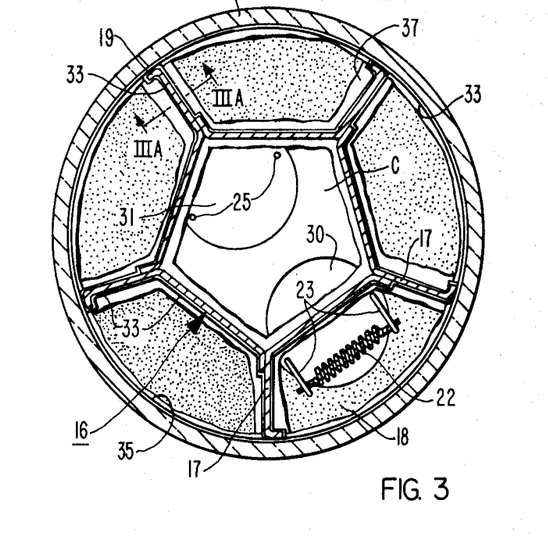

A compact fluorescent lamp 10 of single-ended construction that embodies the present invention is shown in FIGS. 1-3. As will be noted, the lamp comprises a vitreous envelope 12 of tubular configuration and circular cross-section that has a domed end 13 and is terminated at its other end by a vitreous stem 14. The envelope 12 contains an elongated partition assembly 16 which is inserted into the envelope and has a plurality of panel segments 17 that extend longitudinally along and inwardly from the envelope walls. In accordance with the teachings of the aforementioned copending application Ser. No. 47,834, of Young et al., the panel segments 17 are so shaped and arranged that they divide the interior of the envelope 12 into a plurality of interconnected sectors and a central chamber C that constitutes the core of the partition assembly 16, extends along the envelope axis and has a maximum cross-sectional dimension that is from about 25% to 85% of the diameter (or maximum cross-sectional dimension) of the envelope at the same location. Suitable support means such as a pair of transversely-extending disc members 18, 20 are secured to the ends of the partition assembly 16 and close off the core chamber C. A pair of thermionic electrodes 22, 24 are located at opposite ends of the envelope 12. As shown most clearly in FIG. 1, electrode 22 is disposed at the end of one of the envelope sectors defined by the partition assembly 16 and the other electrode 24 is located within the domed end 13 of the envelope 12 above disc member 20. The electrodes are held in such position by suitable conductor means such as rigid lead-in wires 23 and 25 that are sealed to and extend through the stem 14 and are connected to suitable lamp terminals such as two pairs of metal pins 26 and 27 that are secured to and extend from a suitable base member 28 fastened to the sealed end of the envelope 12.

The partition assembly 16 is preferably fabricated from five identically-shaped pieces of sheet metal that are spot welded together (as shown in FIGS. 1 and 3). The transverse discs 18 and 20 are also preferably made from sheet metal. The lead wires 23 that connect with electrode 22 are held in place by a suitable insulator 30 of ceramic material or the like that is seated within a suitable opening in disc 18. The other pair of lead wires 25 extend through a second insulator 31 that is seated within another opening in disc 18 and is so oriented that the lead wires 25 extend along the core chamber C to the other electrode 24, with the lead wires 25 extending through another insulating insert 32 that is seated within a suitable opening provided in the other disc 20. In accordance with the present invention, the core chamber C accordingly serves both as an isolated passageway or conduit for the conductors of one of the electrodes and as a means for forcing the discharge outwardly toward the envelope walls and thus preventing light rays from being "trapped" deep within the interior of the envelope 12 by the corners of the partition structure 16.

Before the envelope 12 is hermetically sealed, it is evacuated, charged with a suitable fill gas (such as argon or a mixture of argon and neon at a pressure of several Torr) and then dosed with mercury through a tubulation 33 (shown in FIG. 2) which extends through the stem 14 and is subsequently tipped off in the usual manner. The envelope 12 thus contains an ionizable medium that sustains an electric low-pressure discharge when the lamp 10 is energized. Each of the panel segments 17 (except one which is adjacent to electrode 22) is provided with an aperture 21 (only one of which is shown in FIG. 1) and such apertures are located at alternate ends of the partition assembly 16 so that the envelope sectors are interconnected and define a single continuous discharge channel that traverses the envelope 12 in retroverted and longitudinal fashion from one of the electrodes to the other. A suitable aperture 34 (shown in FIG. 1) in disc 20 provides a connecting passageway for the discharge from the associated envelope sector to electrode 24 located within the domed end 13 of the lamp 10.

Short circuiting of the arc around the support discs 18, 20 is prevented by fitting the discs with annular gaskets 35, 36 of suitable inert and pliant material that makes a snug fit with the arcuate wall of the envelope 12. For the same reason, the end edges of the panel segments 17 are seated against suitably shaped pads 37, 38 (only one of which is shown in FIG. 1) that are fabricated from the same or similar inert pliant material and are cut to overlap and be sandwiched between the associated ends of the partition assembly 16 and the respective closure discs 18, 20. Short circuiting of the arc along the longitudinal edges of the panel segments 17 is conveniently avoided by forming such edges into laterally extending tabs 19 that are seated against the envelope walls, thus increasing the "arc gap" distance along these junctures and providing a barrier to arc penetration.

Figure 3A:
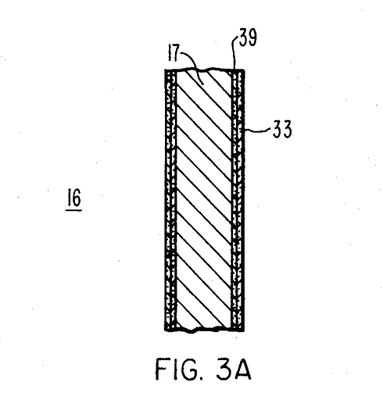
FIG. 3A is an enlarged cross-sectional view through one of the phosphor-coated partitioned panels, along line IIIA—IIIA of FIG. 3.

As shown in FIGS. 1-3, the inner surface of the envelope 12 and the surfaces of the partition assembly 16 and its support discs 18, 20 that are exposed to the discharge are coated with a suitable phosphor 33 that is excited by the ultraviolet radiations generated by the discharge and emits visible radiations when the lamp 10 is energized. Since the interior surfaces of the wall panels of the partition assembly 16 that define the core chamber C are not exposed to the discharge or ultraviolet radiations, they are not coated with phosphor. When the partition assembly 16 is fabricated from sheet metal, as in the illustrated embodiment, it is preferably first coated with an inert light-reflecting material to enhance the light output of the lamp 10. This dual-coating is illustrated in FIG. 3A. Selected parts of the partition assembly 16 are thus provided with a base coat 39 of suitable light-reflecting material (such as $TiO_2$, MgO, BaSO₄, Al₂O₃, ZnO and mixtures thereof) that is overcoated with the phosphor layer 33.

As will be noted in FIG. 1 (and more particularly in FIG. 3), the panel segments 17 in accordance with this particular embodiment are of such configuration that they form five sectors or arc channels that are of equal size, generally trapezoidal in cross-section and disposed around a core chamber C of pentagonal cross-section. The fluorescent lamp 10 is thus of single-ended construction and constitutes a "five-pass" lamp in which the arc discharge longitudinally traverses the envelope 12 five times in retroverted fashion as it passes between the electrodes 22 and 24. Thus, in contrast to conventional longitudinally-partitioned discharge lamps that have both of their electrodes located at the same end of the envelope and inherently provide a discharge channel that traverses the envelope an even number of times, the present invention provides a lamp of the single-ended type that has a discharge channel which forces the arc to traverse the envelope an odd number of times.

Figure 4:
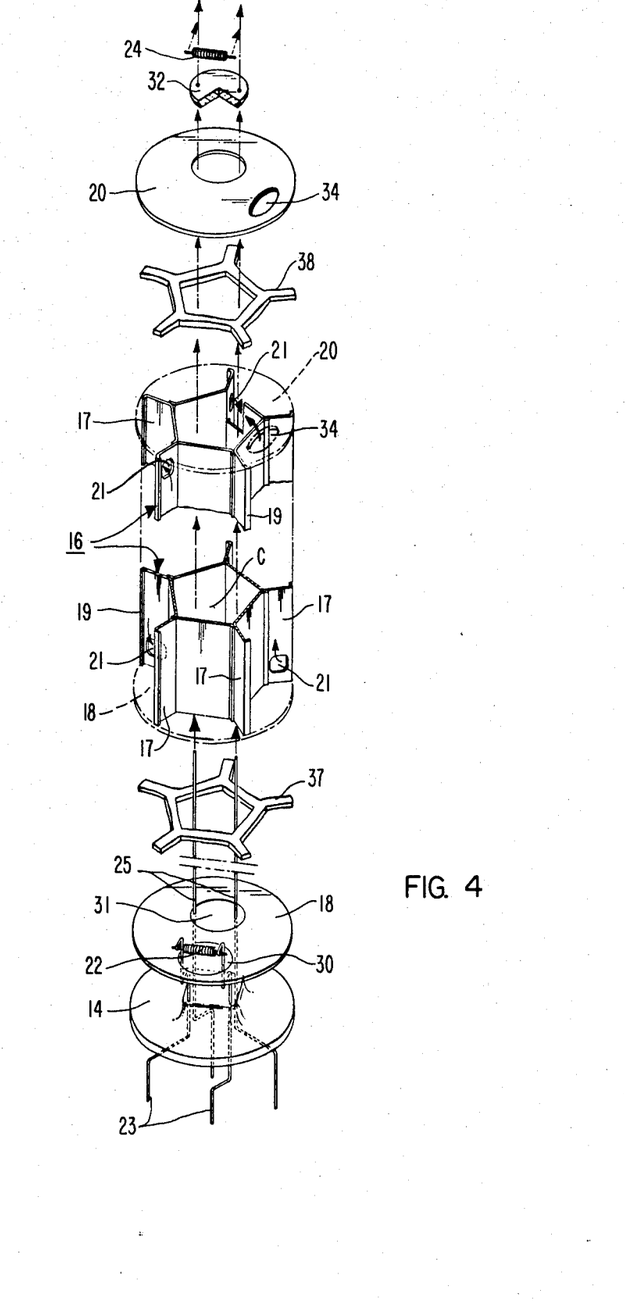
FIG. 4 is an exploded perspective view of the various components of the electrode mount and partition assemblies employed in the fluorescent lamp shown in FIGS. 1-3.

A better understanding of the stem and partition structures of the lamp 10 and the manner in which the discharge traverses the partition assembly 16 will be obtained from FIG. 4. As illustrated, the stem 14 is wafer-like in shape and, in conjunction with the short leads 23 and the two insulator inserts 30 and 31 and pad 37, holds the support disc 18 in abutting engagement with the end of the partition assembly 16 with the electrode 22 disposed between two of the panel segments 17 and the long pair of lead wires 25 extending through the core chamber C of the partition assembly. The ends of the long lead wires 25 extend through the other insulator 32 and are connected to the other electrode 24, said insulator being seated within an opening in the other disc 20 which, in turn, is seated against the associated end of the partition assembly 16 with the other pad 38 sandwiched therebetween. As indicated by the arrows, the arc discharge passes from electrode 22 through the aperture 21 located at the opposite end of the adjacent panel segment 17 and through the remaining apertures 21 located at alternate ends of the partition panels, with the arc finally emerging from the last envelope sector and passing through the aperture 34 in disc 20 to electrode 24.

While a "five-pass" single-ended fluorescent lamp 10 having a partition assembly 16 that provides a core chamber C of pentagonal cross-section is shown in FIGS. 1–3, the invention is not limited to this particular design but includes within its scope discharge lamps that have partition assemblies which provide interconnected envelope sectors which force the arc to longitudinally traverse the envelope any desired odd number of times greater than one (for example three times, seven times, etc.) and have core chambers that are triangular, septagonal, etc. in cross section).

Figure 5:
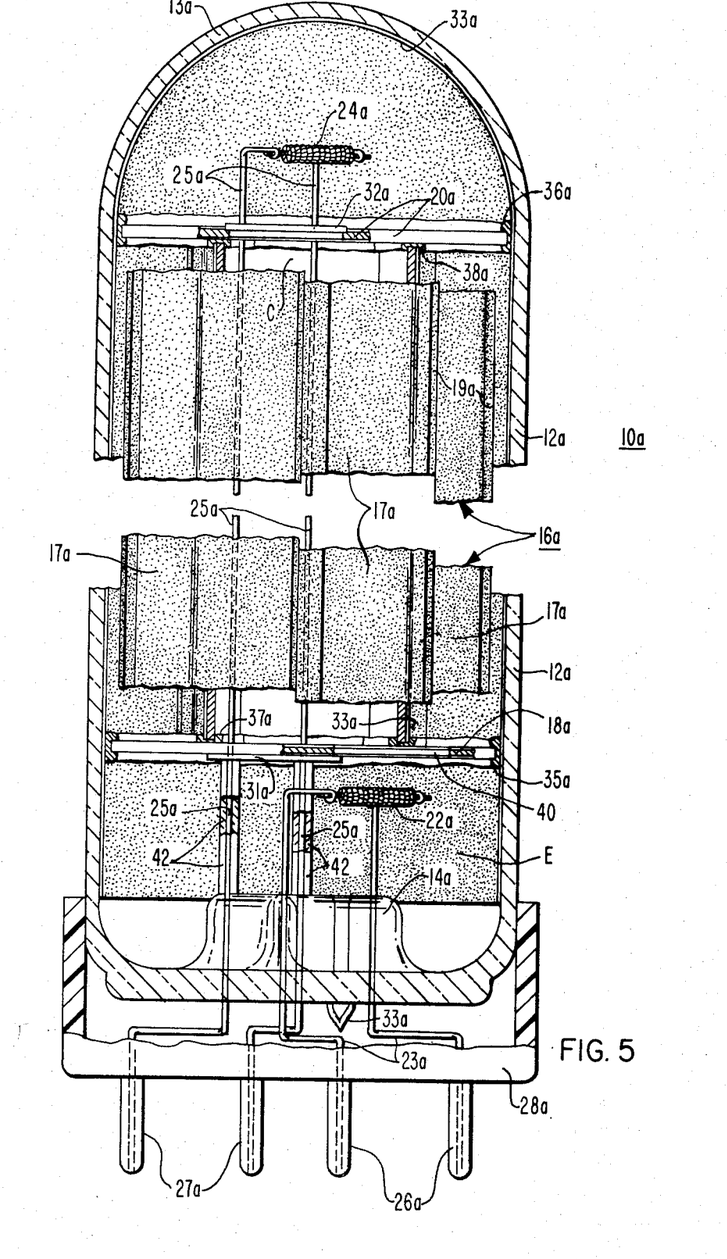
FIGS. 5 and 5A are longitudinal and cross-sectional views, respectively, of an alternative "five-pass" single-ended fluorescent lamp embodying the invention.
Figure 5A:
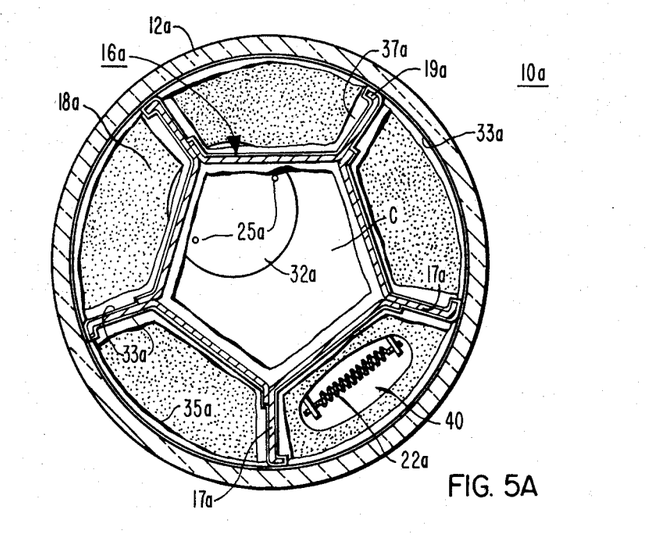

ALTERNATIVE SINGLE-ENDED ODD-PASS FLUORESCENT LAMP (FIGS. 5–5A)

The invention is also not limited to single-ended fluorescent lamps which have one of its electrodes located within the confines of the partition assembly (as is the case in the FIGS. 1–3 embodiment). If desired, the electrodes can be disposed at opposite ends of the envelope at locations beyond the respective ends of the partition assembly. A single-ended "five-pass" fluorescent lamp 10a constructed in this fashion is shown in FIGS. 5 and 5A. In contrast to the previous embodiment, the electrode 22a at the sealed end of the envelope 12a is located in the end chamber E defined by the lower support-disc 18a and the vitreous stem 14a. Communication with the discharge channel defined by the interconnected envelope sectors is achieved through a suitable aperture 40 (shown clearly in FIG. 5A) provided in disc 18a, which aperture is aligned with electrode 22a and is confined to the envelope sector that constitutes one end of the continuous discharge channel. The arc thus passes from electrode 22a, through aperture 40 in disc 18a, through the various interconnected sectors defined by the apertured panel segments 17a of the partition assembly 16a, and finally through a second aperture (not shown) in the other disc 20a to electrode 24a which is located within the domed end 13a of the envelope 12a.

As in the previous embodiment, the inner surface of envelope 12a and the UV-irradiated surfaces of discs 18a, 20a and the partition assembly 16a are all coated with a layer 33a of phosphor. Annular gaskets 35a, 36a and pad components 37a, 38a as well as end tabs 19a on panels 17a are also employed to prevent the arc from bypassing the partition structure, as described in the previous embodiment.

Since the discharge extends into the end chamber E at the sealed end of the envelope 12a, the portions of the long pair of lead wires 25a that are located in and pass through this chamber must be electrically insulated to prevent the arc from passing directly to these lead wire portions from electrode 22a. As shown in FIG. 5, such short-circuiting is prevented by covering the aforementioned portions of the lead wires 25a with suitable insulating material such as a sheath or tight-fitting tube 42 of glass or the like that is desirably fused or anchored to the glass stem 14a.

Locating electrode 22a in closer proximity to the stem 14a and within end chamber E in accordance with this embodiment is advantageous from a functional standpoint since it prevents the end chamber from operating at a temperature which is too low and thereby reducing the mercury vapor pressure to a value that would cause the lamp 10a to operate in a "mercury-starved" condition with a resultant drop in light output.

Figure 6:
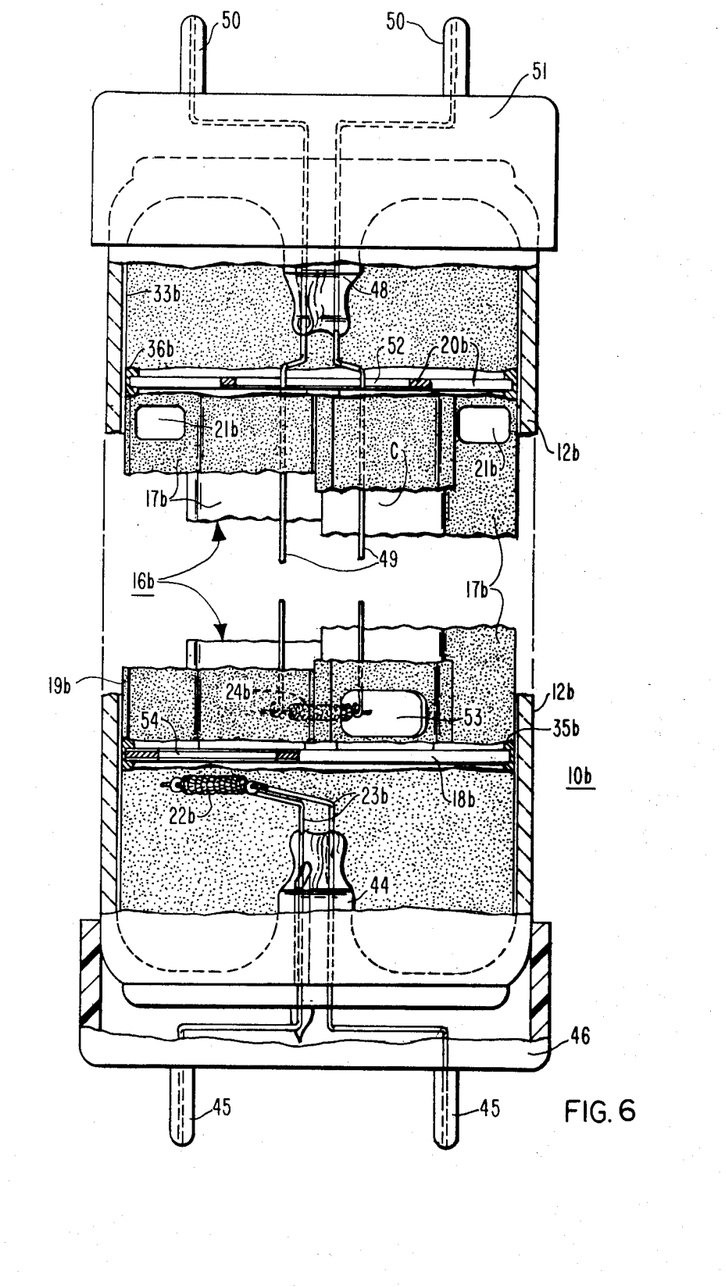
FIG. 6 is an enlarged elevational view of a double-ended "four-pass" fluorescent lamp according to the invention, the central portion of the lamp being omitted and various components being shown in partial cross-section for illustrative purposes.
Figure 7:
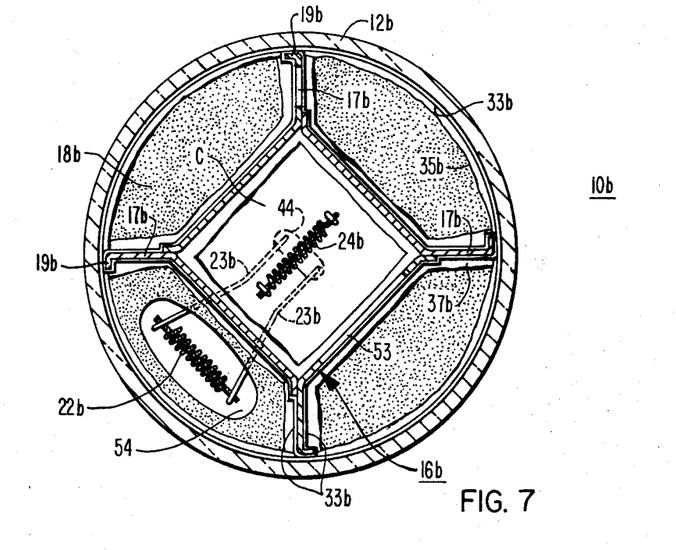
FIG. 7 is a cross-sectional view through the double-ended lamp shown in FIG. 6.

DOUBLE-ENDED EVEN-PASS FLUORESCENT LAMP EMBODIMENT (FIGS. 6–7)

The "dual-purpose core chamber" concept of the present invention also permits double-ended fluorescent lamps of compact size to be constructed that have an even number of "passes" (such as four, six, etc.) instead of the odd number of "passes" usually provided by lamps that have bases and terminals at both ends. A "four-pass" double-ended fluorescent lamp 10b having these heretofore contradictory features is shown in FIGS. 6 and 7.

As will be noted, the tubular vitreous envelope 12b has the usual interior phosphor coating 33b and contains a partition assembly 16b that is inserted into the envelope and held in place by support discs 18b and 20b. The envelope 12b is sealed at each end by vitreous tubular stem components 44 and 48 that are fused to the rim of the envelope in the usual fashion. The short lead-in wires 23b of stem 44 support electrode 22b and connect it to a pair of pin terminals 45 of a suitable base member 46 that is attached to the associated end of the envelope. The other stem 48 has a pair of long lead-in wires 49 that extend through the core chamber C of the partition assembly 16b and connect the second electrode 24b with another pair of pin terminals 50 which extend from a second base member 51 fastened to the associated sealed end of the envelope 12b. As will be noted in FIG. 6, the long pair of lead-in wires 49 extend through a central opening 52 in support disc 20b and are disposed within the core chamber C so that electrode 24b is supported adjacent to electrode 22b within the chamber C but on the opposite side of the other support disc 18b. Thus, even though the lamp 10b is of the double-ended type, the electrodes 22b and 24b are located at the same end of the envelope 12b–and the discharge thus longitudinally traverses the envelope 12b an even number of times when the lamp is energized.

Access to electrode 24b is provided by means of an aperture 53 in an inner wall portion of the partition assembly 16b adjacent disc 18b and access to electrode 22b is provided by another aperture 54 in support disc 18b. The arc discharge thus passes from electrode 22b, through the aligned aperture 54 and the various envelope sectors defined by the partition assembly 16b (passing through the apertures 21b located at alternate ends of the respective panel segments 17b), and finally passes through aperture 53 in the partition wall to the other electrode 24b. The apertured support discs and apertured partition assembly, together with the uniquely positioned electrodes, accordingly define a single continuous arc channel that longitudinally traverses the envelope 12b an even number of times and forces the discharge to enter (but not traverse) the core chamber C of the partition assembly 16b.

As will be noted in FIG. 7, the partition assembly 16b has four panel segments 17b which provide four interconnected envelope sectors of equal size and a core chamber C that is of rectangular configuration, with electrode 24b located at the bottom of the chamber C adjacent the other electrode 22b which is disposed on the opposite side of the support disc 18b. As in the previous embodiments, the longitudinal edges of the panel segments 17b are provided with tabs 19b and suitable compliant gaskets 35b, 36b and separating pads 37b, 38b are employed to prevent the arc from short circuiting and bypassing the support discs or partition structure. The outwardly disposed surfaces of the partition assembly 16b are also coated with phosphor 33a to enhance the light output of the lamp 10b.

Figure 8:
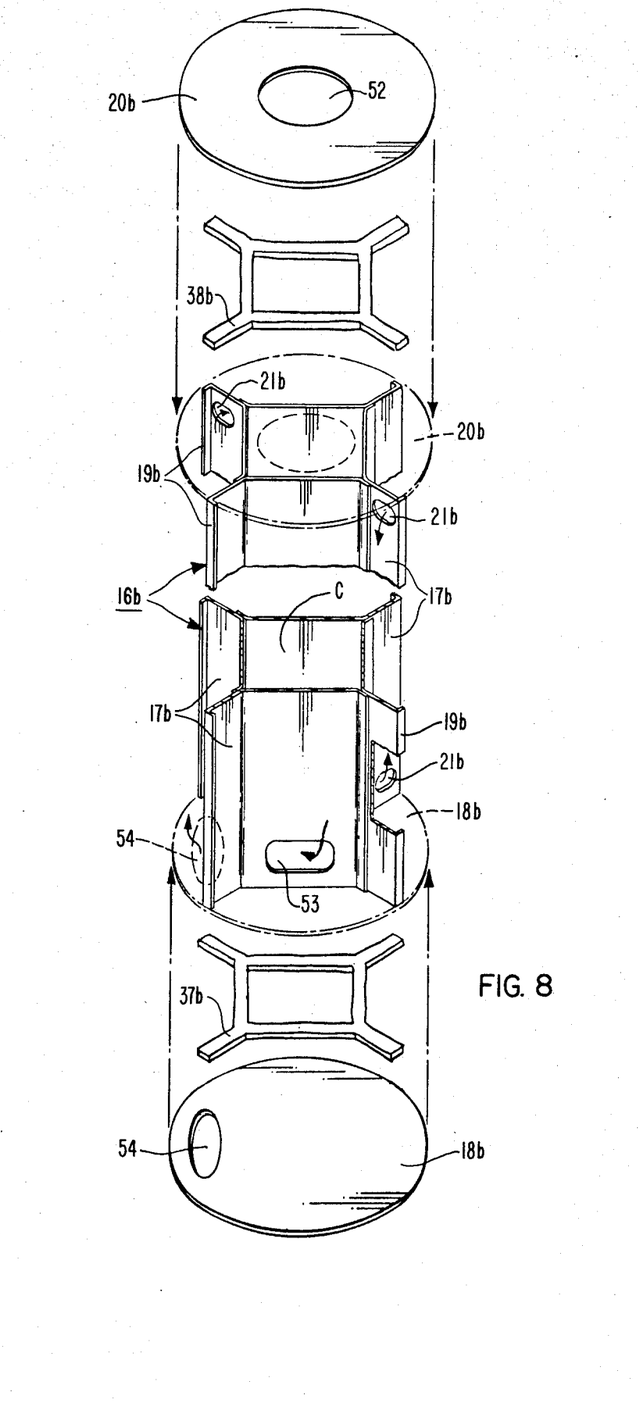
FIG. 8 is an exploded perspective view of the various components of the partition assembly employed in the double-ended lamp of FIGS. 6 and 7.

The structural features of the partition assembly 16b and support discs 18b and 20b and the type of continuous discharge path which they provide are illustrated in greater detail in FIG. 8. As shown, disc 18b is seated against one end of the partition assembly 16b with the compliant pad 37b sandwiched therebetween. The other transverse disc 20b is similarly seated against the opposite end of the partition assembly with pad 38b disposed in overlapped relationship with the end edges of the partition panels. As indicated by the arrows, the arc path extends through aperture 54 in disc 18b, along each of the four arc-channels defined by the panel segments 17b (with the arc passing through the apertures 21b provided at alternate ends of such panel segments), and terminates at the end of the core chamber C which it enters through aperture 53 provided in the inner wall portion of the partition assembly 16b.

We claim as our invention:

1. A low-pressure electric discharge lamp comprising;
    an elongated envelope of vitreous light-transmitting material that has a sealed portion and contains an ionizable medium and a pair of spaced electrodes, conductor means extending into said envelope and connected to the respective electrodes, and
    an elongated partition assembly within said envelope having a plurality of panel segments that define a continuous discharge channel which extends between the electrodes and longitudinally traverses the envelope a predetermined number of times in retroverted fashion,
    the panel segments of said partition assembly extending longitudinally along and inwardly from the walls of said envelope and being so shaped and arranged that they divide the envelope interior into a plurality of interconnected sectors and also form an elongated centrally-located chamber that constitutes the core of said partition assembly but is not part of the discharge channel,
    the size of the core chamber defined by said partition assembly being correlated with that of the envelope and being such that the maximum cross-sectional dimension of the core chamber at a given location is from about 25% to about 85% of the maximum cross-sectional dimension of the envelope at the same location so that the discharge is displaced outwardly toward the envelope walls as it traverses the respective envelope sectors formed by the partition panel segments,
    one of said electrodes being disposed at a location within the envelope that is remote from the sealed portion thereof and the associated conductor means being hermetically joined to said sealed portion and extending therefrom along the core chamber of the partition assembly to said remote electrode so that said core chamber thus also serves as a conduit for said associated conductor means.

2. The low-pressure electric discharge lamp of claim 1 wherein;
    said envelope is terminated at one end by said sealed portion,
    the conductor means for both of said electrodes extend through the sealed end portion of the envelope and said discharge lamp is thus of single-ended construction, and
    one of said electrodes is located at each end of the tubular envelope and the discharge thus longitudinally traverses the envelope an odd number of times.

3. The low-pressure electric discharge lamp of claim 1 wherein;
    said envelope is terminated at each end by a sealed portion and said discharge lamp is thus of double-ended construction, and
    said electrodes are located at the same end of the elongated envelope and the discharge thus longitudinally traverses the envelope an even number of times.

4. The low-pressure electric discharge lamp of claim 1 wherein;
    said ionizable medium is of a type that generates ultraviolet radiations when the lamp is energized, and
    the surfaces of the partition assembly and the tubular envelope that define the discharge channel and are thus exposed to the discharge are coated with phosphor that emits visible radiation in response to impinging ultraviolet radiation produced by the discharge and said lamp thereby comprises a fluorescent lamp.

5. The fluorescent lamp of claim 4 wherein;

said envelope is of tubular configuration and substantially circular in cross-section and the sealed portion thereof includes a vitreous stem which is sealed to and terminates the envelope and the lamp is thus of the single-ended type, said conductor means comprise two pairs of lead-in wires that extend through said stem and are connected to the respective electrodes, the core chamber of said partition assembly is isolated from the electric discharge by a pair of closure members that are secured to the respective ends of the partition assembly and extend transversely therefrom to the envelope walls, and said electrodes are located at opposite ends of the envelope so that the discharge longitudinally traverses the envelope an odd number of times.

6. The single-ended fluorescent lamp of claim 5 wherein;

the electrode at the sealed end of the envelope is located inwardly from the associated closure member and is disposed within one of the envelope sectors, and the associated pair of lead-in wires extend through said associated closure member.

7. The single-ended fluorescent lamp of claim 5 wherein ;

said closure members are of disc-like configuration, said stem is spaced from the transverse disc-like member located at that end of the envelope and thus provides an end chamber, one of the electrodes is disposed within said end chamber and is accessible to the discharge through an aperture in the interposed disc-like member, and the portions of the other pair of lead-in wires that extend through the end chamber are covered with insulating material to prevent short-circuiting of the electric discharge within said end chamber.

8. The single-ended fluorescent lamp of claim 5 wherein;

said partition assembly and disc-like members are fabricated from sheet metal and comprise an integrated structure that is inserted into the envelope, and at least one pair of lead-in wires extends through one of the sheet metal disc-like members and is electrically isolated therefrom by insulator means secured to the associated disc-like member.

9. The fluorescent lamp of claim 4 wherein;

said envelope is of tubular configuration and substantially circular in cross-section and is terminated at each end by a vitreous stem that is sealed to the envelope and said lamp is thus of the double-ended type, said pair of electrodes are located at the same end of the envelope, said conductor means comprise two pairs of lead-in wires that extend through the respective stems and are connected to the associated electrodes, the partition assembly is terminated at each end by a disc-like member that is secured to the assembly and traversely extends to the envelope wall, one of said electrodes is located within the core chamber of the partition assembly proximate the end thereof and is accessible to one of the envelope sectors and the discharge through a passageway defined by an aperture in a chamber-defining wall of the partition assembly, and the remaining electrode is so oriented that the discharge longitudinally traverses the envelope an even number of times as it passes between the electrodes through said discharge channel.

10. The double-ended fluorescent lamp of claim 9 wherein:

said partition assembly and disc-like members are fabricated from sheet metal and comprise an integrated structure that is inserted into the envelope, and the lead-in wires that are disposed within and traverse the core chamber of the partition assembly extend through an opening in the disc-like member that is located at the end of the envelope which is remote from said electrodes.

* * * * *